E. A. LELAND.
WATER-CLOSET.
No. 172,570.  Patented Jan. 25, 1876.
Fig: 1.
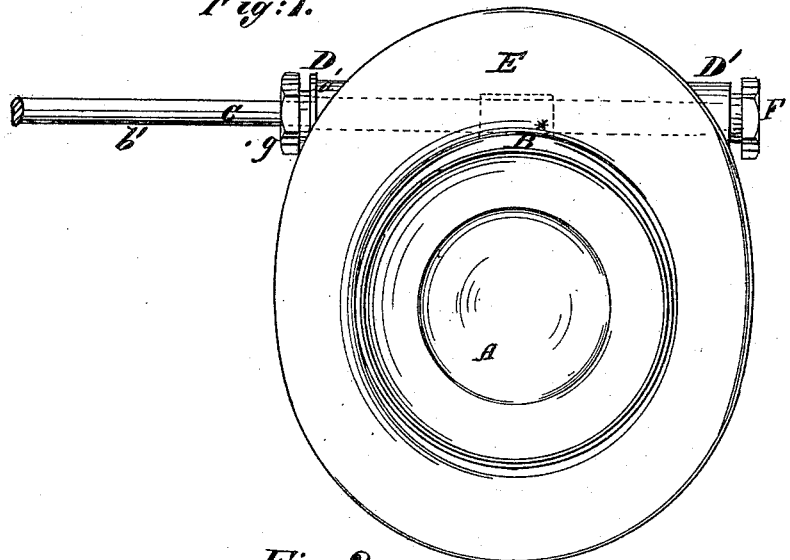
Fig: 2.
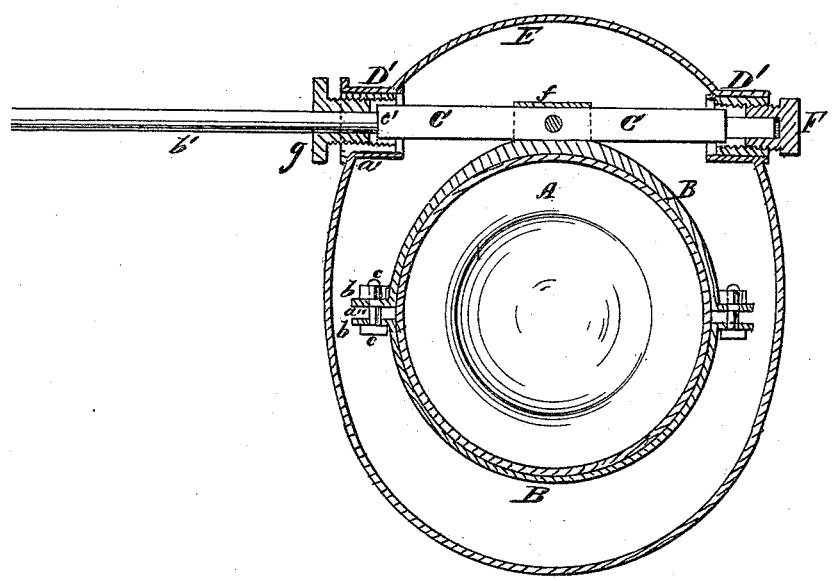
Fig: 3.
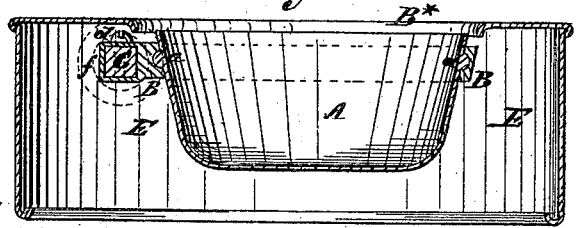
Witnesses:
H. Wells Jr.
Elbert Dearborn
Inventor
Edwin A. Leland
per
James A. Whitney
Atty.

UNITED STATES PATENT OFFICE.

EDWIN A. LELAND, OF PITTSFIELD, MASSACHUSETTS, ASSIGNOR TO LEONARD RICHARDSON, OF BROOKLYN, NEW YORK.

IMPROVEMENT IN WATER-CLOSETS.

Specification forming part of Letters Patent No. 172,570, dated January 25, 1876; application filed August 11, 1875.

*To all whom it may concern:*

Be it known that I, EDWIN A. LELAND, of Pittsfield, in the county of Berkshire and State of Massachusetts, have invented certain Improvements in Water-Closets, of which the following is a specification:

In order to replace or repair the pans of water-closets of ordinary construction, it is necessary to remove the entire seat or surrounding curb to afford access to the pan, thereby involving much extra labor and expense.

This invention is designed to obviate all this; and to this end it consists in a novel combination of a rock-shaft and holding nuts and screws, with bearings provided in the seat or curb aforesaid, and a socket formed or provided to the pan, whereby the pan may be detached from the rock-shaft by the lateral withdrawal of the latter from the sockets.

The invention further comprises a novel combination of a clamp, constructed with a socket for attachment to the rock-shaft, with the pan, whereby the pan, after its separation from the rock-shaft, may be removed from the socket, and replaced by another, whereby a plain pan may be used in lieu of one specially constructed for direct attachment to the rock-shaft.

Figure 1 is a plan view, showing my invention. Fig. 2 is a horizontal sectional view of the same, taken in the line $x$ of Fig. 1; and Fig. 3 is a vertical sectional view, taken in the line $y$ of Fig. 1.

A is the pan, of porcelain, metal, or both combined. This pan is formed, preferably, with a circumferential bead, $a$, at or near its upper edge, at the outer side thereof. B is a circular clamp, the ends $b$ of which are turned outward to form ears, as shown at $a''$ in Fig. 2, and furnished with the tightening-screw $c$. The inner surface of this clamp is hollowed to fit upon the bead $a$, and by tightening the screw $c$ the clamp is firmly affixed to the pan A. On one side of the clamp B is a squared or other suitably-shaped socket, $f$, into which, as herein presently explained, is thrust the central portion of the rock-shaft C, the said portion of the rock-shaft being of corresponding shape and diameter, so that any tilting movement given to said shaft will be given to the pan held in the clamp, as is required in the use or operation of the pan in the working of the water-closet. When desired, a screw, $d$, may be arranged to tighten the socket upon the shaft, and to prevent its slipping upon the same. D D' are bearings formed upon opposite sides of the curb E of the water-closet, the bearing D being enlarged and extended outward, as shown at $a'$. This extension $a'$ is formed with an internal screw-thread, into which is screwed the tubular nut $g$. The rock-shaft is thrust through and into the two bearings D D', and through the socket of the pan, into the position with reference to the latter hereinbefore described. A nut, F, is screwed into the bearing D' at the outer end thereof, to prevent the undue movement of the rock-shaft in that direction, while the hollow nut $g$ being passed over the outwardly-projecting end $b'$ of the rock-shaft, and screwed into the threaded extension $a$ of the bearing D, rests in sufficient contiguity to a shoulder, $c'$, formed on the rock-shaft, to prevent any longitudinal movement of the latter in the opposite direction.

The requisite tilting movement being given to the rock-shaft by any of the usual or by any appropriate devices, the pan, supported as hereinbefore described, may be tilted or operated in the performance of its usual functions.

In order to remove the pan for repair or replacement, it is only necessary to remove the tubular nut $g$, and, if such be used, to loosen the screw $d$, whereupon the rock-shaft may be longitudinally withdrawn, and the pan, having been meanwhile duly grasped with the hand, may be turned edgewise and brought up and out through the ordinary opening B* of the curb. This done, the screw $c$ of the clamp is turned or removed to loosen the clamp from the pan, whereupon the latter may be taken out, and substituted by another, or itself, after repairs or inspection, replaced. The clamp, with the pan held therein and thereby, is then held in position, and the rock-shaft being thrust back to its place, the tubular nut is screwed back into the extension $a'$, and the parts are held in position as before.

What I claim as my invention is—

1. The rock-shaft C, constructed to fit through and within the socket $f$, attached to or formed on the pan A, in combination with the bearings D D' and tubular nut $g$, provided to the curb E, the whole arranged for use and operation substantially as and for the purpose set forth.

2. The clamp B, constructed with the socket $f$, outwardly-projecting ends or ears $a''$, and tightening-screw $c$, in combination with the pan A, substantially as and for the purpose set forth.

EDWIN A. LELAND.

Witnesses:
H. WELLS, Jr.,
ELBERT DEARBORN.